Nov. 20, 1934.　　　I. FLORMAN　　　1,981,787
SHAVING MACHINE
Filed Aug. 25, 1934
Fig.1　　　Fig.2　　　Fig.3
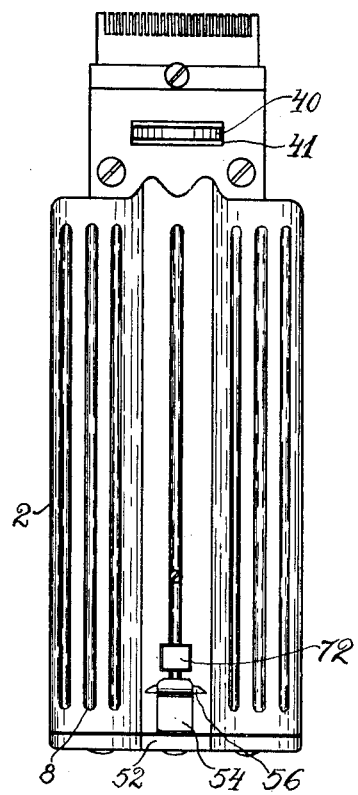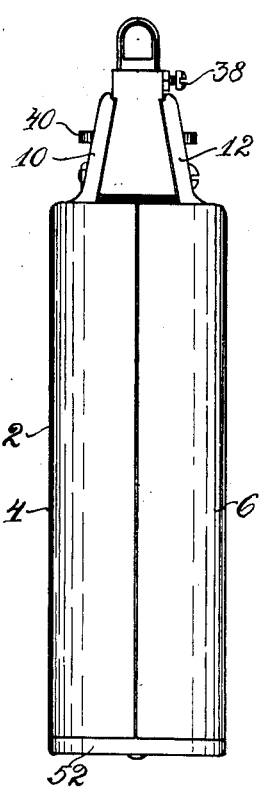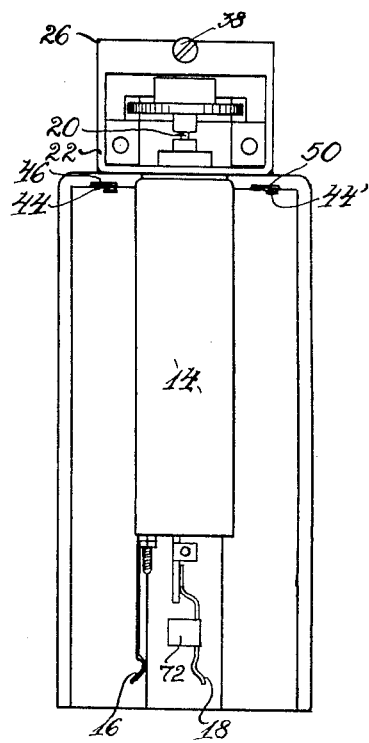
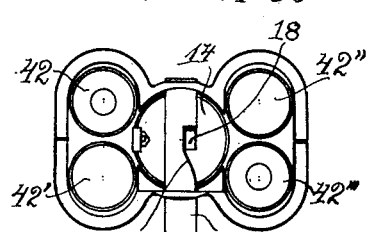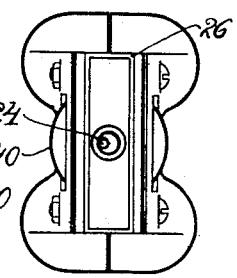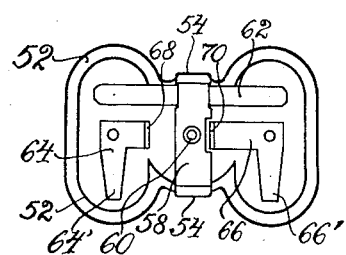
Fig.8　　　Fig.4　　　Fig.9
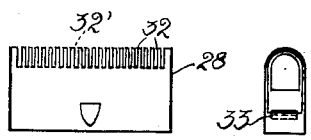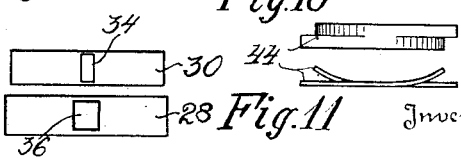
Fig.5　　Fig.6　　Fig.7　　Fig.11
Fig.10
Inventor
Irving Florman
By Bailey & Larson
Attorneys Patented Nov. 20, 1934

1,981,787

UNITED STATES PATENT OFFICE 1,981,787

SHAVING MACHINE

Irving Florman, New York, N. Y.

Application August 25, 1934, Serial No. 741,499

5 Claims. (Cl. 30—12)

This invention relates to electric razors of the so called clipper type, and more particularly it relates to such razors driven by a small motor powered by dry cell batteries. The entire arrangement is of a size which can be easily grasped and manipulated with one hand.

Electrically driven razors of the clipper type have hitherto been marketed and used to some extent. Such razors or clippers have the advantage that no lather or cream need be applied to the face, the devices being manipulated when the skin is dry. They have usually been powered by house current and thus can be used where such current is available. It is conceivable, however, that heavy storage batteries could be used for power in which case the device would be connected to the storage batteries by an electric wire or cable. Because of the possibility of shocks, especially severe since the razor is used in bath rooms or other places where water may have spilled, great care to make them safe must be taken. Consequently, such razors as described sell at a high price and are still regarded as quite a luxury which only a comparatively few can afford.

My invention avoids the necessity of having an electric house current outlet present. Moreover, no heavy storage batteries or wires of any kind are necessary. Such a dry cell battery powered razor as I provide is ideal for country or farm life, beach or mountain resorts, travelling, and the like. Moreover, the danger of receiving shocks is entirely eliminated. The importance of this cannot be overestimated. Because precautions need not be taken to avoid shocks, and because no electric wires are required, and also because of the simple and compact arrangement of the parts, my invention can be produced to sell at a moderate sum well within the reach of the average shaver.

The ease and safety with which the invention may be used makes it an ideal shaving instrument for ladies for removing superfluous hairs. When so used, the clipper element may be provided with a transversely rounded shaving surface as shown herein, although the clipper element may also have a flat shaving edge.

The objects of my invention are to provide such a razor.

In the drawing:

Fig. 1 is a front elevation of my invention.

Fig. 2 is a side elevation.

Fig. 3 is a front elevation with one of the handle portions removed to show the motor, batteries and contacts.

Fig. 4 is a top plan view with the clipper elements removed.

Figs. 5 and 6 are front and end elevations respectively of the clipper elements.

Fig. 7 is a bottom view of the two clipper elements in unassembled condition comprising the clipper unit.

Fig. 8 is a bottom plan view with the detachable bottom plate removed.

Fig. 9 is a top plan view of the bottom plate showing the arrangement of the contacts and attaching means.

Fig. 10 is a plan view of one of the battery connecting contacts.

Fig. 11 is a side view of the contact shown in Fig. 10.

Referring now to Figs. 1, 2 and 8, it will be seen that the arrangement comprises a handle member 2 which also serves as housing. This handle housing is preferably formed of two portions 4 and 6 of any suitable material such as wood, hard rubber or other insulating material. From Fig. 8 it will be seen that the shape of the handle makes the instrument easy to grasp and manipulate. Gripping ribs 8 may be provided if desired.

The upper ends of the two portions 4 and 6 are provided with extensions 10 and 12 (see Figs. 2 and 4) which enclose or grip the upper end of the operating mechanism to be described hereinafter.

The reference numeral 14 (Figs. 3 and 8) indicates the housing of a D. C. electric motor. The housing is of cylindrical shape. From the base of the cylinder two contact members 16 and 18 extend. The motor is adapted to turn a shaft 20 which extends coaxially with the axis of the cylinder 14 and which extends from the upper end thereof.

A yoke member 22 generally of rectangular shape is rigidly secured to the upper end of the cylinder 14. The shaft 20 extends through the base of the yoke member 22 and extends through the top cross bar of said yoke as indicated in Fig. 4. The upper end of the shaft is provided with an eccentrically mounted pin 24 for a purpose to be described later.

The upper cross bar of the yoke 22 has upwardly extending edges 26 which form a shallow rectangular recess for receiving the clipper elements 28, 30 which form the clipper unit.

The clipper unit, more clearly shown in Figs. 5, 6 and 7 may be of the general type shown and described in the United States patent to Schick No. 1,747,031. It suffices here to state that the upper edge of each of the elements 28 and 30 is provided with a series of openings 32, 32'. The element 30, as will be described in detail, is caused to reciprocate rapidly in a longitudinal direction, the keen edges of the transverse openings 32, 32' as they pass one another causing a clipping action. As shown in the drawing, and as distinguished from the Schick patent, the clipping or shaving surface is rounded transversely. Such a surface is particularly efficient when the device is used by ladies, for example, for removing superfluous hair under the arms. It is to be understood, however, that a clipper member with a flat edge may also be used, that is, where the clipper member is frustoconical in cross-section.

The bottom surface of the inner clipper element 30 is preferably rectangular in shape and is provided with a cut out recess 34 and the bottom surface of the other element 28 is likewise provided with a cut out recess 36 which, as will be apparent from Fig. 7, is of larger size than the recess 34.

The rectangular bottom of the element 28 is of a size just sufficient to permit it to enter the recess in the upper cross bar of the yoke 22 which recess is formed by the walls 26 (see Fig. 4). A lock screw 38 may be employed to retain the clipping elements in position while the device is operated. When the element 28 is engaged in the recess in the top cross bar of the yoke 22, the upper end of the motor shaft 20 enters the cut out recess 36 in the clipper element 28 and the eccentric pin 24 extends into the cut out recess 34 of the inner clipper element 30. Small springs 33 (Fig. 6) may be employed to force clipper element 30 upwardly within the clipper element 28 so that the rounded upper portions of the clipper elements are in engagement.

From the above description it will be apparent that operation of the motor and consequent rotation of the shaft 20, will, because of the engagement of the eccentric pin 24 with the recess 34 of the inner clipper element 30, cause the latter to reciprocate quickly within the outer clipper element 28 to effect a clipping action.

To aid the motor in starting or for quickly stopping the same, the shaft 20 is provided with a wheel 40 which is rigidly secured thereto. As seen in Figs. 1 and 4 this wheel 40 extends through elongated apertures 41 in the extended portions 10 and 12 of the housing or handle.

As previously indicated, the motor 14 is powered by dry cell batteries. In the embodiment shown, four of such batteries 42, 42', 42'' and 42''' are provided. The batteries 42 and 42' which lie one behind the other (Figs. 3 and 8), have their similar poles at opposite ends. At their upper ends they are connected electrically by any suitable means such as by the spring connecting piece 44 (Figs. 10 and 11) which is disposed in the recess 46 in the upper inside end of the handle or housing 2. The other two batteries 42'' and 42''', which are disposed on the other side of the motor 14, are also connected at their upper end by a spring contact member 44', similar to the contact member 44, which is held in place by a recess 50 similar to the recess 46. The batteries must, however, be arranged in a manner similar to that shown in Fig. 8 so that the lower ends of the batteries 42' and 42''' will have different poles.

The reference numeral 52 (Figs. 1, 2 and 9) indicates a closure member which is adapted to retain the batteries in place. The closure member may be detachably secured to the handle or housing 2 by means of spring clips 54 which engage recesses or cut out niches 56 in the outer surface of the handle or housing. Fig. 9 is a top plan view of the closure member 52 after the same has been removed and shows the arrangement of contacts thereon. As shown therein, the spring clips 54 are connected to the closure member by an integral bar 58 secured to the closure member 52 by means of a rivet or other suitable means 60. The reference numeral 62 represents a spring contact which may pass beneath the bar 58 to be held in place thereby, or may be otherwise secured in place. The purpose of this contact is to connect the poles of batteries 42' and 42'''. Also secured to the closure member 52 are two separate contacts 64 and 66 which have contact portions 64' and 66' for contacting the respective poles of the batteries 42 and 42'' (Fig. 8). These contacts 64 and 66 also have integral upstanding portions 68 and 70 respectively. When the closure member is in place, the upstanding portion 68 is in continuous contact with the spring contact 16 extending from the bottom of the motor cylinder 14. The other upstanding portion 70 is then spaced slightly from the other motor spring contact 18.

To operate the motor these last two elements 70 and 18 must contact. This may be accomplished by any suitable means. As shown in the drawing, it is accomplished by a simple push button 72 which is slidable transversely in the handle or housing 2 as shown most clearly in Fig. 8. The button is preferably rectangular in shape and square in cross section. As indicated at 74 one of its surfaces, namely the one adjacent the spring contact 18, is provided with a cut out cam surface. This cam surface is such that when the button is pressed in one direction the cam surface engages the spring contact 18 and presses the same against the tension thereof into engagement with the upstanding contact 70 to complete the circuit for the motor. Pushing the button in the other direction will break the contact.

From the above description, the advantages of the invention will be clear. The device shown provides a perfect dry "shave" by clipping the hair growth at the skin surface. This is accomplished without danger of shock and without the use of house current heavy storage batteries or wires. The neat and compact arrangement which is both simple in construction and operation can be made to sell at a moderate price well within the reach of the average shaver.

Although the drawing and the above specification disclose the best modes in which I have contemplated embodying my invention, I desire to be in no way limited to the details of such disclosure, for in the further practical application of my invention, many changes in the construction and in the details may be made as circumstances may require or experience suggest without departing from the spirit of the invention within the scope of the appended claims.

What I claim is:

1. A shaving machine comprising, a hollow handle, an electric non-self-starting direct current motor arranged within said handle, relatively movable shaving members carried by said handle, means connecting said motor to said shaving members to cause relative movement therebetween, said means including a shaft extending from said motor in the direction of said members, a source of direct current enclosed within said handle, a switch member a part of which extends out of said handle for connecting said source of current with said motor, and a manually turned disc secured on said shaft and extending out of said handle for starting said motor when the same is connected to the source of current.

2. A shaving machine comprising, a hollow handle, a direct current motor arranged within said handle, a plurality of dry cell batteries disposed within said handle about said motor, relatively movable shaving members carried by said handle at one end thereof, means connecting the motor to said shaving members to cause relative movement therebetween, means connecting the positive and negative poles of said batteries at their ends adjacent said shaving members, a removable end piece for the other end of said handle, a pair of contacts leading from said motor, contact means on the inner face of said end piece for the battery circuit and for connecting said pair of contacts to opposite poles of said circuit.

3. A shaving machine comprising a hollow handle, an electric direct current motor arranged within said handle, a plurality of dry cell batteries arranged about said motor and disposed within said handle, relatively movable shaving members carried by said handle, means connecting said motor to said shaving members to cause relative movement therebetween, and a switch member for connecting said batteries with said motor, said handle being wider at the edges than in the center, said switch member including a member movable transversely of said handle and partly extending therefrom through openings disposed centrally of the wider edges.

4. A shaving machine comprising a hollow handle, an electric direct current motor arranged within said handle and enclosed in a cylindrical casing, pairs of elongated dry cell batteries arranged on each side of said cylindrical casing and within said handle, the batteries of each pair having poles of opposite polarity at the same end, relatively movable shaving members carried by one end of said handle, means connecting the motor to said shaving members to cause relative movement therebetween, means for connecting the opposite poles of each pair of batteries at their ends nearest the end of the handle carrying said shaving members, a detachable end piece for the other end of said handle, the inner face of said end piece carrying contacts for connecting the negative pole of one pair of batteries with the positive pole of the other pair, motor contacts extending from said cylindrical casing, corresponding contacts carried by the said end piece, and connected to the other poles of each pair of batteries at the end covered by said end piece, and a switch a part of which extends from the handle for completing the circuit from said batteries to said motor.

5. A shaving machine comprising a hollow handle wider at its sides than at its center, an electric motor disposed within the central portion of said handle, dry batteries disposed within said wider side portions of said handle on each side of said motor for empowering the same, relatively movable shaving members carried by said handle, and means connecting said shaving members to said motor to cause relative movement between said members.

IRVING FLORMAN.